US008010086B2

(12) United States Patent  (10) Patent No.: US 8,010,086 B2
Gupta  (45) Date of Patent: Aug. 30, 2011

(54) SYSTEM AND METHOD FOR PROVIDING LOCATION INFORMATION WITH VOICEMAIL MESSAGES

(75) Inventor: Shekhar Gupta, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 365 days.

(21) Appl. No.: 12/275,739

(22) Filed: Nov. 21, 2008

(65) Prior Publication Data

US 2010/0130173 A1  May 27, 2010

(51) Int. Cl.
 *H04M 11/10* (2006.01)
(52) U.S. Cl. ............... 455/413; 455/414.1; 455/415; 455/417; 455/456.3

(58) Field of Classification Search ............... 455/456.1, 455/456.3, 412.1, 412.2, 413, 415, 417
See application file for complete search history.

(56) References Cited

U.S. PATENT DOCUMENTS

| 2009/0186629 | A1* | 7/2009 | Soelberg et al. | 455/456.1 |
| 2010/0035585 | A1* | 2/2010 | Hadinata et al. | 455/413 |

* cited by examiner

*Primary Examiner* — Temica M Beamer
(74) *Attorney, Agent, or Firm* — SNR Denton US LLP

(57) ABSTRACT

Embodiments of the present invention include a method for providing a user with a location of a caller associated with a voicemail message. In one embodiment, the method includes identifying the caller associated with the voicemail message. The method determines the location of the caller and associates the location with the voicemail message left by the caller. The method provides the location of the caller associated with the voicemail message to the recipient of the voicemail message.

18 Claims, 4 Drawing Sheets

SYSTEM AND METHOD FOR PROVIDING LOCATION INFORMATION WITH VOICEMAIL MESSAGES

BACKGROUND OF THE INVENTION

A voicemail is a recorded message intended for a recipient of a telephone call. A voicemail system is a centralized system that manages voicemails for a plurality of people. The voicemail system notifies or alerts a recipient of a voicemail when a new voicemail is received. For example, with some communication devices, a user may be notified using visual voicemail. Visual voicemail displays information about a stored voicemail, such as, a callet's name, the calling number, the time of the call, and the duration of the voicemail message.

SUMMARY

Embodiments of the present invention include a method for providing a user with a location of a caller associated with a voicemail message. In one embodiment, the method includes identifying the caller associated with the voicemail message. The method determines the location of the caller and associates the location with the voicemail message left by the caller. The method provides the location of the caller associated with the voicemail message to the recipient of the voicemail message.

BRIEF DESCRIPTION OF THE DRAWINGS

For a more complete understanding of the present application, the objects and advantages thereof, reference is now made to the following descriptions taken in conjunction with the accompanying drawings, in which.

DETAILED DESCRIPTION OF THE DRAWINGS

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Figure 1:
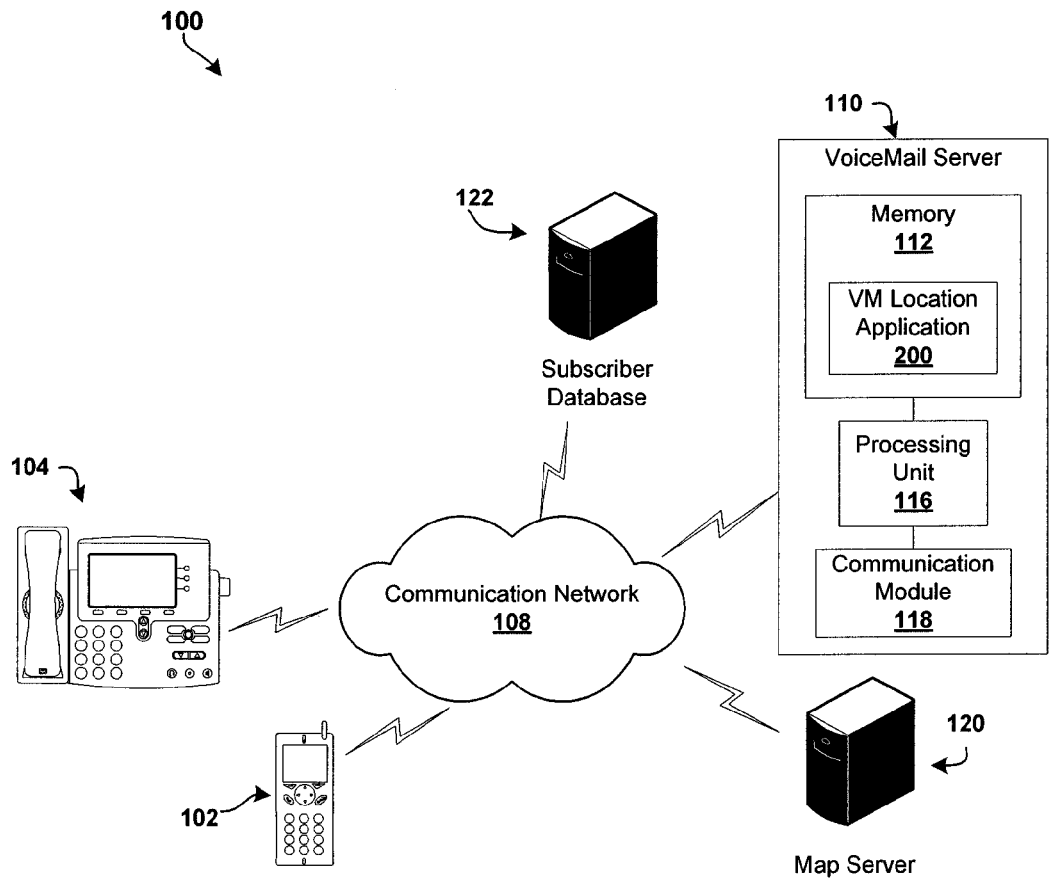
FIG. 1 depicts an embodiment of a network environment in which the illustrative embodiments may be implemented.

FIG. 1 depicts a network environment 100 in which the illustrative embodiments may be implemented for providing a user, i.e., a recipient of a call, with the location of a caller associated with a voicemail message. In the depicted embodiment, a mobile device 102 and/or a wired communication device 104 communicates with a voicemail server 110 for leaving voicemail messages for an intended user.

Mobile device 102 is a hand-held wireless communication device, such as, but not limited to, a cellular phone or a personal digital assistant (PDA). In some embodiments, mobile device 102 may also have wireless internet capability to communicate with other mobile devices and/or computing devices over the Internet.

Wired communication device 104 is any communication device that does not communicate wirelessly, such as, but not limited to, a regular landline telephone and/or an IP telephone.

Mobile device 102 and wired communication device 104 are associated with special codes/identifiers for identifying a particular communication device. In some embodiments, the special codes/identifiers are also used to identify a service provider associated with a particular communication device. Additionally, in some embodiments, the special codes/identifiers may also be used to identify an owner/subscriber associated with a particular communication device.

Communication network 108 provides a communication medium for mobile device 102 and wired communication device 104 to communicate with other communication devices and/or data processing systems, such as, but not limited to, voicemail server 110. Communication network 108 may include wireless and wired networks, data and/or voice networks, such as, but not limited to, the Internet and the publicly switched telephone networks (PSTN) including an Signaling System 7 (SS7) network and/or other types of communication networks. In some embodiments, communication network 108 may represent a single service provider' communication network or may comprise multiple communication networks of different service providers.

Voicemail server 110 handles the voice messaging services of network environment 100. In general, in some embodiments, voicemail server 110 records, stores, and plays voicemail messages. In one embodiment, voicemail server 110 comprises, among other components, memory 112, a processing unit 116, and a communication interface 118. Processing unit 116 may comprise one or more microprocessors for handling vast amounts of data simultaneously. Processing unit 116 executes computer usable program code, such as, but not limited to, computer instructions stored in memory 112. For example, in one embodiment, memory 112 stores voicemail location application 200 for providing a user with a location of a caller associated with a voicemail message. As will be further described, in some embodiments, voicemail server 110 communicates over communication network 108 with other data processing systems, such as, but not limited to, map server 120 and/or subscriber database 122 to provide a user with a location of a caller associated with a voicemail message.

Figure 2:
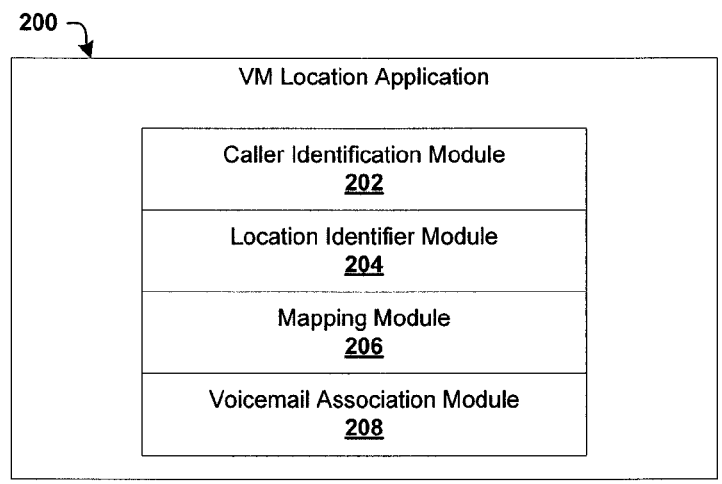
FIG. 2 depicts an embodiment of a voicemail location application in accordance with the illustrative embodiments.

FIG. 2 depicts one embodiment of voicemail location application 200. In the depicted embodiment, voicemail location application 200 comprises caller identification module 202, location identifier module 204, mapping module 206, and voicemail association module 208.

In one embodiment, caller identification module 202 includes computer usable program code to determine an identifier associated with a communication device used by a caller leaving a voicemail message. For example, in one embodiment, caller identification module 202 determines a phone number associated with the communication device used by the caller leaving the voicemail message. Additionally, in some embodiments, caller identification module 202 determines an IP address associated with the communication device used by the caller leaving the voicemail message, such as, but not limited to, when the communication device is an IP telephone.

Location identifier module 204 performs a reverse lookup using the identifier to determine the location of the communication device used by the caller. For example, in some embodiments, voicemail server 110 communicates with subscriber database 122 to determine whether the identifier is associated with a wired or wireless communication device. In one embodiment, responsive to the identifier being associated with a wired communication device, location identifier module 204 determines the location of the caller based on subscriber information associated with the identifier that is provided by subscriber database 122.

However, in some embodiments, if the identifier is associated with a wireless communication device, location identifier module 204 may determine the location of the caller using cell tower triangulation. Cell tower triangulation is a process by which the location of a wireless communication device can be determined by measuring either the radial distance, or the direction, of the received signal from two or three different cell towers/base transceiver stations. For example, in one embodiment, location identifier module 204 communicates with a mobile switching center (MSC) within communications network 108 to determine the location of the caller by using the base transceiver stations of communications network 108 to triangulate the signal transmitted by the wireless communication device of the caller. Further, in some embodiments, the wireless communication device of the caller may transmit and/or location identifier module 204 may retrieve global positioning coordinates associated with the wireless communication device to determine the location of the wireless communication device.

In some embodiments, mapping module 206 passes the location and/or the global positioning coordinates to a mapping server, such as, but not limited to, map server 120 to retrieve an address and/or a displayable map of the identified location of the caller at the time the voicemail message was recorded.

Voicemail association module 208 associates the identified location and/or the retrieved displayable map with the voicemail message left by the caller. In some embodiments, voicemail association module 208 sends the location information along with a voicemail notification to a communication device of a recipient of the voicemail message. For example, in one embodiment, the communication device of the recipient of the voicemail message may utilize a visual voicemail application to display a voicemail notification that includes the location of the caller at the time the voicemail.

Figure 3:
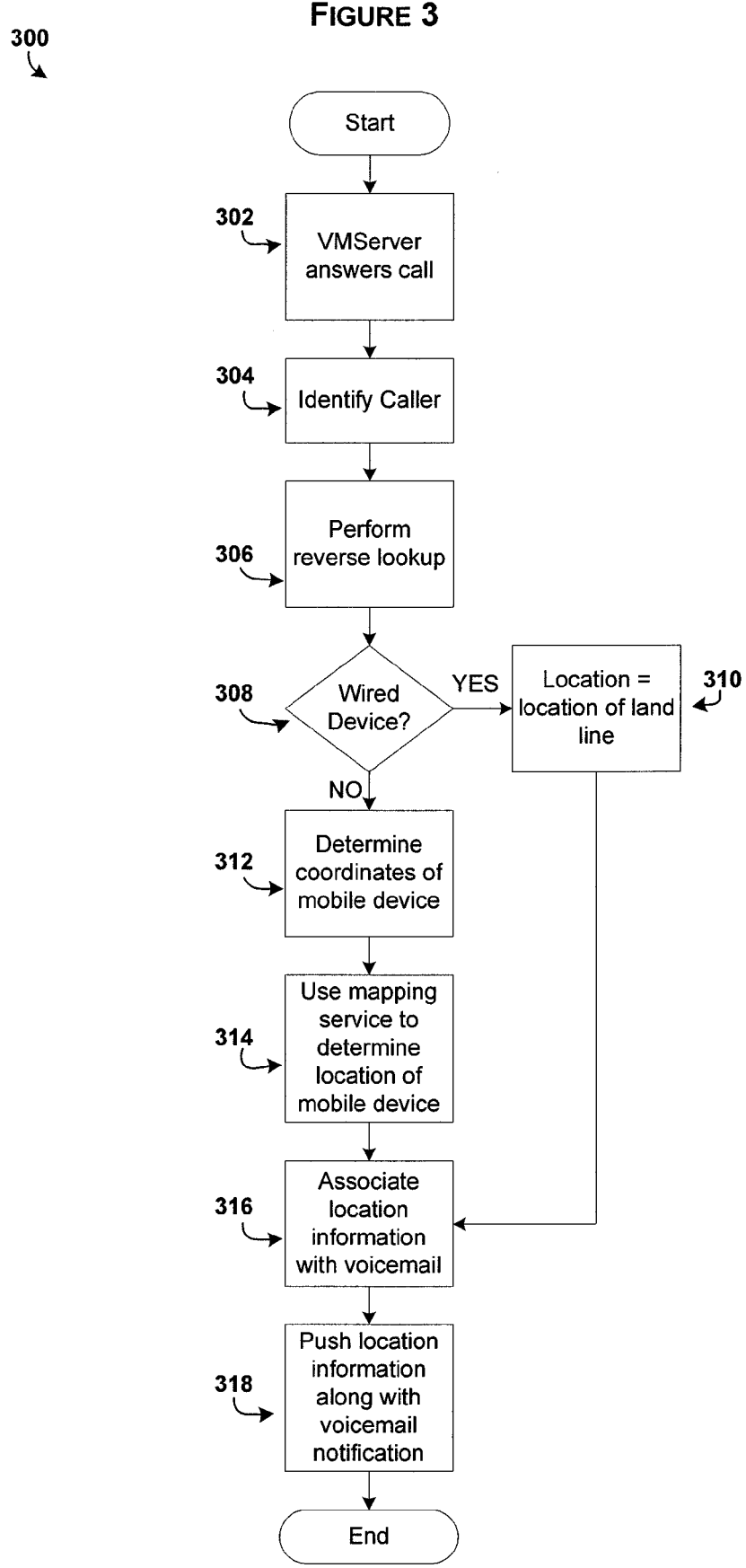
FIG. 3 depicts an embodiment of a process for providing a user with the location of a caller associated with a voicemail message.

FIG. 3 depicts an embodiment of a process 300 for providing a user with the location of a caller associated with a voicemail message. Process 300 may be performed by a data processing system, such as, but not limited to, voicemail server 110. Process 300 starts at step 302 where voicemail server 110 answers an incoming caller. At step 304, the process identifies the caller by retrieving an identifier, such as, but not limited to, a phone number and/or an IP address, of a communication device utilize by the caller.

The process, at step 306, performs a reverse lookup using the identifier to determine whether the communication device is a wired or wireless communication device. For example, in some embodiments, the process may communicate with a subscriber database, such as, subscriber database 122, to determine the type of device associated with the identifier. If the process determines at step 308, that the communication device is a wired device, the process, at step 310, sets the location of the caller to the physical location of the wired device as specified in subscriber database 122.

However, if the process determines that the communication device is a wireless device, then the process, at step 312, determines the coordinates of the wireless communication device. As previously stated, in some embodiments, this may be performed by, but not limited to, using cell tower triangulation and/or by retrieving the global positioning coordinates associated with a GPS enabled wireless communication device.

At step 314, the process passes the coordinates to a mapping service to determine the location, such as, but not limited to, the street address, of the caller with respect to a map. For example, in some embodiments, the process may pass the coordinates to remote map server, such as, but not limited to, map server 120 to generate a map of the location of the caller. In other embodiments, the process may perform the mapping process locally. In addition, in some embodiments, the mapping process may be able to link the geographical coordinates to an actual facility, such as, but not limited to, a particular store, hospital, building complex, school, park, amusement park, etc.

At step 316, the process associates the location information with the voicemail message left by the caller. In some embodiments, the process, at step 318, pushes/sends the location information along with the voicemail notification to a communication device of the recipient of the voicemail message to have the location information displayed with the voicemail notification, with process 300 terminating thereafter.

Figure 4:
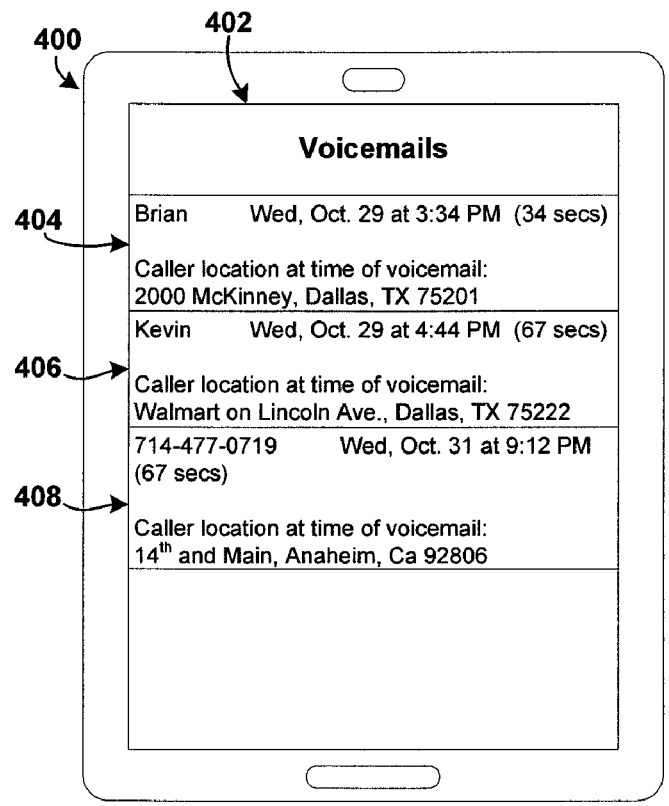
FIG. 4 depicts an embodiment of a visual voicemail user interface for providing a user with the location of a caller associated with a voicemail message.
Figure 4A:
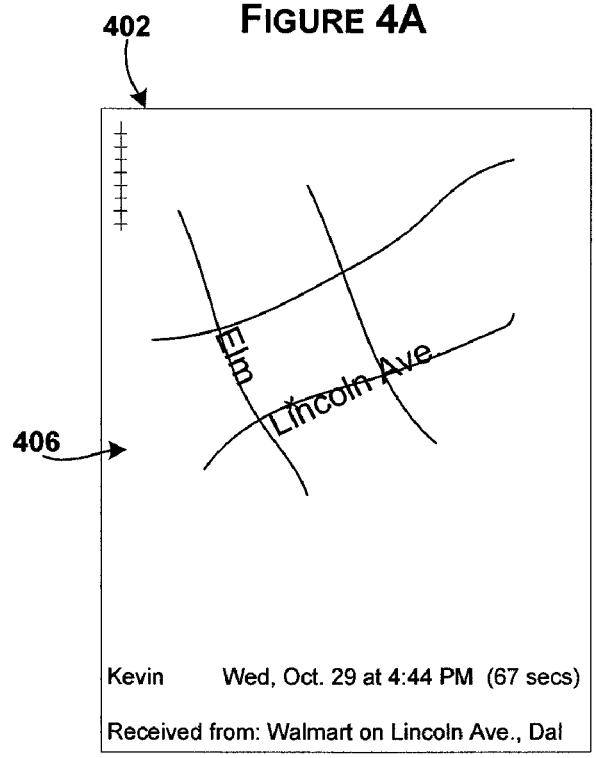
FIG. 4A depicts an embodiment of a user interface for providing a user with a visual map of the location of a caller associated with a voicemail message.

FIG. 4 depicts an embodiment of a communication device 400 having a visual voicemail user interface 402 for providing a user with the location of a caller associated with a voicemail message. In the depicted embodiment, visual voicemail user interface 402 notifies the user of voicemail messages 404, 406, and 408. In one embodiment, voicemail messages 404, 406, and 408 respectively depicts information associated with the voicemail message such as, but not limited to, the identity of the caller, e.g., the name and/or telephone number of the caller, the date/time of the call, the duration of the voicemail message, and the location of the caller at the time the voicemail message was recorded. In some embodiments, if the user selects a depicted voicemail message, such as, but not limited to, voicemail message 406, visual voicemail user interface 402 may display a map of the location of the caller as depicted in FIG. 4A.

Figure 5:
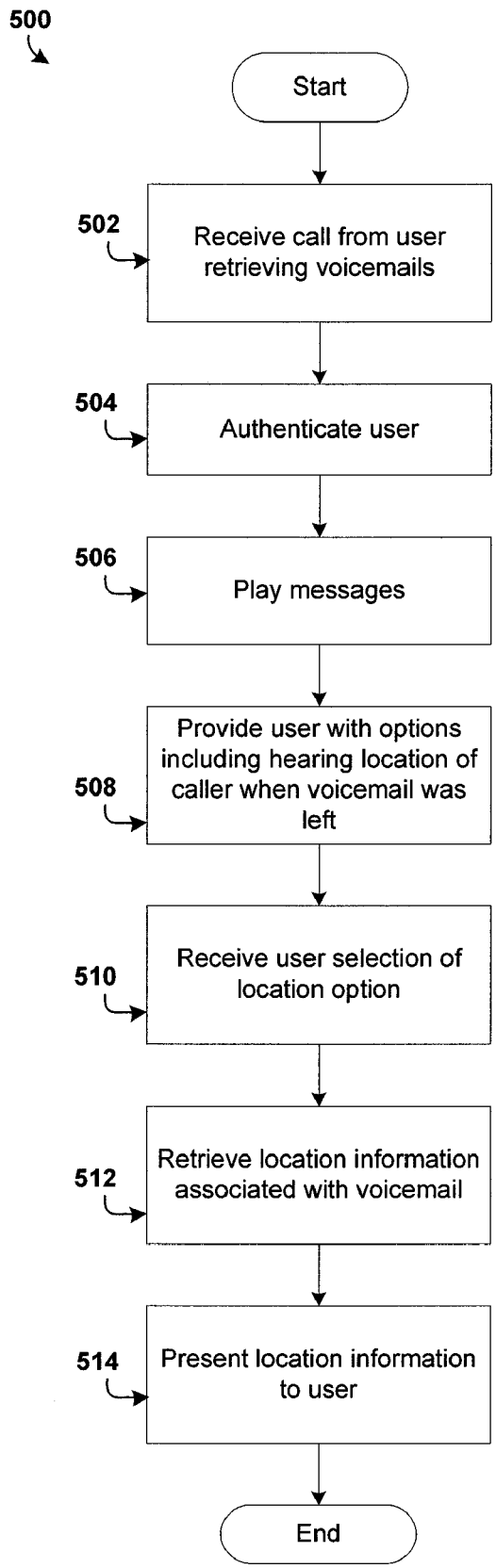
FIG. 5 depicts an embodiment of a process for remotely retrieving the location of a caller associated with a voicemail message.

FIG. 5 depicts an embodiment of a process 500 for remotely retrieving the location of a caller associated with a voicemail message. Process 500 begins by receiving a call from a user to retrieve voicemail messages from a voicemail system at step 502. At step 504, the process authenticates the user by, but not limited, verifying an access code associated with the voicemail account. At step 506, the process plays a recorded voicemail message to the user. After playing the recorded voicemail message, the process, at step 508, presents the user with some options, such as, but not limited to, replaying the voicemail message, deleting the voicemail message, saving the voicemail message, and, in some embodiments, an option to hear the location of the caller at the time the voicemail message was received. In this embodiment, at step 510, the process receives a user selection of the location option presented at step 508. The process, at step 512, retrieves the location information of the caller associated with the respective voicemail message. The process announces the location information to the user at step 514, with process 500 terminating thereafter. Of course, in some embodiments, the location of the caller may automatically be announced prior to or following the playing of a voicemail message.

Accordingly, the disclosed embodiments present a system and method for enabling a recipient of a voicemail message to know the location of the caller associated with a voicemail message. In one embodiment, the method includes identifying the caller associated with the voicemail message. The method determines the location of the caller and associates the location with the voicemail message left by the caller. The method provides the location of the caller associated with the voicemail message to the recipient of the voicemail message.

As will be appreciated by one skilled in the art, the disclosed embodiments may be embodied as a system, method, or computer program product. Accordingly, the disclosed embodiments may be implemented entirely with hardware or as a software embodiment (including firmware, resident software, micro-code, etc.) or an embodiment combining software and hardware aspects that may all generally be referred to herein as a "circuit," "module" or "system." Furthermore, the disclosed embodiments may take the form of a computer program product embodied in any tangible medium of expression having computer-usable program code embodied in the medium.

Computer program code for carrying out operations of the present invention may be written in any combination of one or more programming languages, including an object oriented programming language, such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the, specified functions or acts, or combinations of special purpose hardware and computer instructions.

What is claimed:

1. A method for providing a recipient of a voicemail message with a location of a caller associated with the voicemail message, the method comprising:
    identifying the caller associated with the voicemail message;
    determining the location of the caller;
    associating the location with the voicemail message; and
    providing the location of the caller associated with the voicemail message to the recipient of the voicemail message in response to receiving a user-selection of an option to verbally announce the location of the caller associated with the voicemail message after the voicemail message has been played.

2. The method of claim 1, wherein identifying the caller associated with the voicemail message includes communicating with at least one service provider subscriber database.

3. The method of claim 1, wherein providing the location of the caller associated with the voicemail message to the recipient of the voicemail message includes displaying the location of the caller using visual voicemail notification.

4. The method of claim 1, wherein providing the location of the caller associated with the voicemail message to the recipient of the voicemail message includes associating the location of the caller with a displayable map indicating the location of the caller at the time the voicemail message was recorded.

5. The method of claim 1, further comprising:
   determining an identifier associated with a communication device used by the caller;
   determining whether the identifier is associated with a wired communication device; and
   responsive to the identifier being associated with a wired communication device;
      determining the location of the caller based on subscriber information obtained from a service provider database.

6. The method of claim 5, wherein the identifier is a phone number.

7. The method of claim 5, wherein the identifier is an internet protocol address.

8. The method of claim 5, further comprising responsive to the identifier being associated with a wireless communication device, determining the location of the caller using cell tower triangulation.

9. The method of claim 5, further comprising responsive to the identifier being associated with a wireless communication device, determining the location of the caller using global positioning coordinates associated with the wireless communication device.

10. A voicemail server comprising:
    memory in communication with a processing unit, the memory including computer usable program code, and the processing unit operable to execute the computer usable program code to:
    identify the caller associated with the voicemail message;
    determine the location of the caller;
    associate the location with the voicemail message; and
    provide the location of the caller associated with the voicemail message to a recipient of the voicemail message in response to receiving a user-selection of an option to verbally announce the location of the caller associated with the voicemail message after the voicemail message has been played.

11. The voicemail server of claim 10, wherein the processing unit further executes the computer usable program code to:
    determine an identifier associated with a communication device used by the caller;
    determine whether the identifier is associated with a wired communication device; and
    determine the location of the caller based on subscriber information associated with the identifier.

12. The voicemail server of claim 11, wherein the processing unit further executes the computer usable program code to determine the location of the caller using cell tower triangulation in response to the identifier being associated with a wireless communication device.

13. The voicemail server of claim 11, wherein the processing unit further executes the computer usable program code to determine the location of the caller using global positioning coordinates of a wireless communication device associated with the caller.

14. The voicemail server of claim 10, wherein the processing unit further executes the computer usable program code to enable displaying of the location of the caller in a visual voicemail notification.

15. The voicemail server of claim 10, wherein the processing unit further executes the computer usable program code to associate the location of the caller with a displayable map indicating the location of the caller at the time the voicemail message was recorded.

16. The voicemail server of claim 10, wherein the processing unit further executes the computer usable program code to announce the location of the caller associated with the voicemail message when the recipient of the voicemail message retrieves the voicemail message.

17. The voicemail server of claim 16, wherein announcing the location of the caller associated with the voicemail message when the recipient of the voicemail message retrieves the voicemail message is performed in response to the recipient selecting a location information option.

18. A computer program product comprising computer executable instructions to:
    identify the caller associated with the voicemail message;
    determine the location of the caller;
    associate the location with the voicemail message; and
    provide the location of the caller associated with the voicemail message to the recipient of the voicemail message in response to receiving a user-selection of an option to verbally announce the location of the caller associated with the voicemail message after the voicemail message has been played.

* * * * *